3,686,191
PROCESS FOR PREPARING 2-PYRIDINOL
PHOSPHATES
Tatsumi Nishimura and Itsuki Okuda, Shimizu, and
Masaru Kado, Yokohama, Japan, assignors to Kumiai
Chemical Industries Co., Ltd., Tokyo, Japan
No Drawing. Filed Feb. 9, 1971, Ser. No. 114,062
Int. Cl. C07d *31/24, 31/26*
U.S. Cl. 260—294.8 K                  13 Claims

ABSTRACT OF THE DISCLOSURE

Organic phosphates having excellent insecticidal properties and shown by the general formula

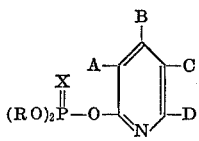

wherein R is a lower alkyl group, A, B, C and D represent hydrogen or halogen atom and X represents oxygen or sulfur atom are prepared by reacting a halogen-substituted or non-substituted pyridone-2 with a di-lower alkyl hydrogen-phosphite or a di-lower alkyl thionohydrogenphosphite in the presence of a polyhalohydrocarbon and a base.

---

The present invention relates to a process for producing organic phosphates.

This process consists in a process for producing organic phosphates having the general formula

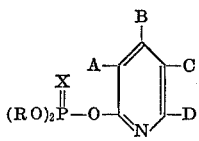
(I)

wherein R is a lower alkyl group, A, B, C and D represent hydrogen or halogen atom and X represents oxygen or sulfur atom, which comprises reacting a halogen-substituted or non-substituted pyridone-2 with a di-loweralkyl hydrogenphosphite or a di-loweralkyl thionohydrogenphosphite in the presence of a polyhalohydrocarbon and a base.

The object of the present invention is to provide insecticides predominantly having an excellent properties.

The process of the present invention can be shown by the following equation:

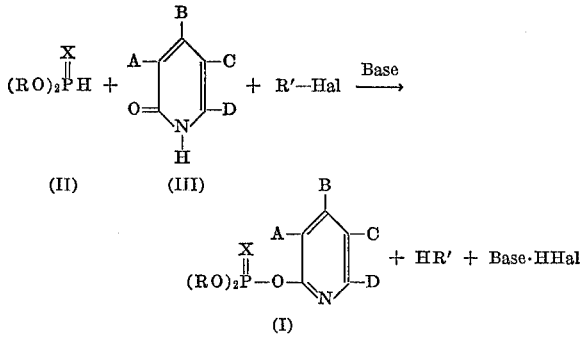

wherein R, X, A, B, C and D have the same meanings as described above, R' represents the residue of the above described polyhalohydrocarbon and Hal represents halogen atoms.

The polyhalohydrocarbons include carbon tetrachloride, tetrachloroethane, chloroform, bromoform, trichlorobromomethane and dibromotetrachloroethane.

In the practice of this process, aromatic hydrocarbons, such as benzene, toluene, xylene and the like and polyhalohydrocarbons, such as carbon tetrachloride, tetrachloroethylene, chloroform and the like may be used as a solvent.

The reaction varies depending upon the compound and the solvent but the reaction proceeds within a broad temperature range of 0° C. to 80° C. and particularly room temperature is preferable.

Furthermore, the base includes aliphatic amines, such as trimethylamine, triethylamine, tripropylamine, etc.; aromatic amines, such as dimethylaniline, diethylaniline, etc.; cyclic amines, such as hexatetramine and an alkali hydroxide.

The reactant of pyridone-2 having the above Formula III is usually referred to as 2-hydroxypyridine and has the following formula:

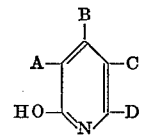

wherein A, B, C and D have the same meanings as described above and according to J. Chem. Soc. 1967 (C), 1542–3 and J. Chem. Soc. 1967 (B), 758–761, the following equilibrium exists.

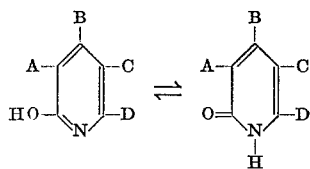

and the keto type presents more than 65%.

When it is intended to produce the compounds of the present invention by a conventional process wherein the above described pyridone-2 is reacted with

wherein R and X have the same meanings as described above, the following reaction proceeds,

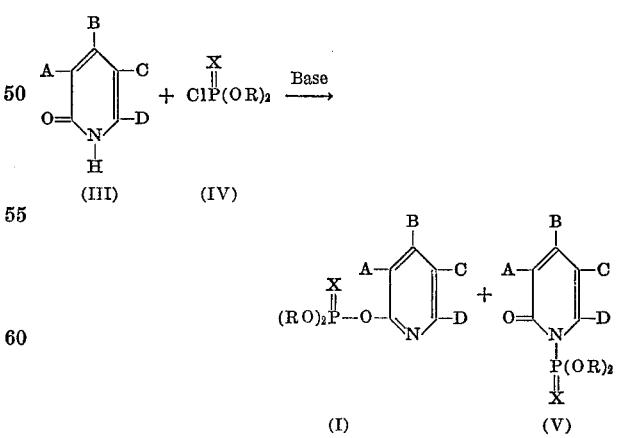

wherein R, X, A, B, C and D have the same meanings as described above.

It has been found experimentally that even if the base or the reaction condition is changed variously in the above reaction, the two compounds are produced simultaneously and the objective product is obtained only in low yield and in impure state.

On the other hand, the process of the present invention produces only the objective product and the product having the above described general Formula I can be obtained in high purity and high yield. In this point this process claimed here is advantageous and has a commercial merit.

The following examples are given in illustration of this invention and are not intended as limitations thereof. In each example, the present invention and the conventional method are compared.

EXAMPLE 1

Production of 2 - (dimethoxyphosphinyloxy - 3,5 - dichloropyridine.

To a suspension of 16.4 g. (0.1 mole) of 3,5-dichloropyridone-2, 15.3 g. (0.1 mole) of carbon tetrachloride and 11 g. (0.1 mole) of dimethyl hydrogenphosphite in 200 cc. of benzene was added dropwise a solution of 10 g. (0.1 mole) of triethylamine in 50 cc. of benzene with stirring. The reaction proceeded to precipitate by-produced triethylamine hydrochloride with evolution of reaction heats. After completion of the addition, stirring was continued under reflux for 4 hours to complete the reaction. After cooling, the precipitated triethylamine hydrochloride, the amount of which was quantitatively 13.6 g., was filtered off and then the filtrate was washed with water, dried with anhydrous sodium sulfate, and concentrated to obtain 27 g. of crystallizable oily substance. This substance was recrystallized from ligroin to obtain 25 g. of a white prismatic crystal having a melting point of 48–9° C. The yield was 92.8%.

*Elementary analysis.*—Found (percent): P, 11.30. Calculated (percent): P, 11.36.

The IR spectrum of this compound had not absorption band at 1,680–1,675 cm.$^{-1}$ (absorption band of pyridone).

To compare with, the same objective product was prepared in a conventional method. To a solution of 16.4 g. (0.1 mole) of 3,5-dichloropyridone-2 and 30 g. (0.3 mole) of triethylamine in 200 cc. of benzene was added dropwise a solution of 14.5 g. (0.1 mole) of dimethylphosphorylchloride in 50 cc. of benzene with stirring. After completion of the addition, stirring was continued under reflux for 4 hours to complete the reaction. After cooling the precipitated triethylamine hydrochloride, the amount of which was quantitatively 13.5 g., was filtered off, and then the filtrate was neutralized with diluted acid to a pH of 5.5, washed with water, dried with anhydrous sodium sulfate, and concentrated to obtain 10 g. of crystallizable oily substance. This substance was recrystallized from ligroin to obtain 7.5 g. of a white prismatic crystal having a melting point of 47–9° C. The yield was 27.6%.

*Elementary analysis.*—Found value: P, 11.25%, Calculated value: P, 11.36.

The IR spectrum of this compound had an absorption band of pyridone at 1,680–1,675 cm.$^{-1}$ in addition to the absorption band of the objective product. This is probably due to the presence of small amount of the compound (V).

EXAMPLE 2

Production of 2-(diethoxyphosphinyloxy)-3,5-dichloropyridine.

To a suspension of 16.4 g. (0.1 mole) of 3,5-dichloropyridone-2, 15.3 g. (0.1 mole) of carbon tetrachloride and 13.8 g. of (0.1 mole) of diethyl hydrogenphosphite in 200 cc. of benzene was added dropwise a solution of 10 g. (0.1 mole) of triethylamine in 50 cc. of benzene with stirring. The resulting mixture was treated in the same manner as described in Example 1 to obtain 32.3 g. of a white prismatic crystal having a melting point of 37–8° C. The yield was 92.8%.

While, according to the conventional method, a white prismatic crystal having a melting point of 35–7° C. was obtained in a yield of 83.5%. In the compound obtained by the conventional method, the IR spectrum showed somewhat absorption at 1,685–1,670 cm.$^{-1}$ assigned to >C=O of pyridone.

EXAMPLE 3

Production of 2-(diisopropoxyphosphinyloxy)-3,5-dichloropyridine.

To a suspension of 16.4 g. (0.1 mole) of 3,5-dichloropyridone-2, 15.3 g. (0.1 mole) of carbon tetrachloride and 16.6 g. (0.1 mole) of diisopropyl hydrogen-phosphite in 200 cc. of benzene was added dropwise a solution of 10 g. (0.1 mole) of triethylamine in 50 cc. of benzene with stirring. The resulting mixture was treated in the same manner as described in Example 1 to obtain 36.5 g. of a white prismatic crystal having a melting point of 61–2° C. The yield was 90.0%.

While, according to the conventional method, a white prismatic crystal having a melting point of 58–60° C. was obtained in a yield of 59.8%. In the compound obtained by the conventional method, the IR spectrum showed somewhate absorption at 1,685–1,670 cm.$^{-1}$ assigned to >C=O of pyridone.

EXAMPLE 4

Production of 2-(diethoxyphosphinothioyloxy)pyridine.

To a suspension of 9.5 g. (0.1 mole) of pyridone-2, 15.3 g. (0.1 mole) of carbon tetrachloride and 15.4 g. (0.1 mole) of diethyl thionohydrogenphosphite in 200 cc. of benzene was added dropwise a solution of 10 g. (0.1 mole) of triethylamine in 50 cc. of benzene while stirring. The reaction proceeded to precipitate by-produced triethylamine hydrochloride with evolution of reaction heats. After completion of the addition, stirring was continued under reflux for 4 hours to complete the reaction. After cooling, 12.8 g. of by-produced triethylamine hydrochloride was filtered off, and then the filtrate was washed with water, dried with anhydrous sodium sulfate and concentrated, and then low boiling point substances were removed under a condition of 40° C./2 mm. Hg to obtain 29.8 g. of a light brown clear oil.

Yield: 83%
$n_D^{15}$: 1.5019

While, according to the conventional method, no objective product was obtained.

EXAMPLE 5

Production of 2-(diethoxyphosphinyloxy)pyridine.

To a suspension of 9.5 g. (0.1 mole) of pyridone-2, 15.3 g. (0.1 mole) of carbon tetrachloride and 13.8 g. (0.1 mole) of diethyl hydrogenphosphite in 200 cc. of bromoform was added dropwise a solution of 10 g. (0.1 mole) of triethylamine in 50 cc. of benzene with stirring. The resulting mixture was treated in the same manner as described in Example 4 to obtain 28.9 g. of a light brown clear oil. This substance was considerably decomposed by heat and light.

Yield: 80%
$n_D^{15}$: 1.4612

While according to the conventional method, no objective product was obtained.

EXAMPLE 6

Production of 2-(diethoxyphosphinothioyloxy)-3,5-dichloropyridine.

16.4 g. (0.1 mole) of 3,5-dichloropyridone-2 and 15.4 g. (0.1 mole) of diethyl thionohydrogenphosphite were suspended in 200 cc. of trichlorobromomethane, and then a solution of 10 g. (0.1 mole) of triethylamine in 50 cc. of benzene was added dropwise thereto with stirring. The resulting mixture was treated in the same manner as described in Example 4 to obtain 37.2 g. of a light yellow clear oil.

Yield: 85%
$n_D^{15.5}$: 1.5356

Product obtained by the conventional method (French Pat. No. 1,360,901).

Yield: unknown
$n_D^{25}$; 1.5336

EXAMPLE 7

Production of 2-(diisopropoxyphosphinothioyloxy)pyridine.

9.5 g. (0.1 mole) of pyridone-2, 15.3 g. (0.1 mole) of carbon tetrachloride and 18.2 g. (0.1 mole) of diisopropyl thionohydrogenphosphite were suspended in 200 cc. of benzene, and then a solution of 10 g. (0.1 mole) of triethylamine in 50 cc. of benzene was added dropwise thereto with stirring.

The resulting mixture was treated in the same manner as described in Example 4 to obtain 33.6 g. of a yellow clear oil.

Yield: 82%
$n_D^{17.5}$: 1.4720

While, according to the conventional method, no object product was obtained.

EXAMPLE 8

Production of 2 - (diisopropoxyphosphinothioyloxy)- 3,5-dichloropyridine.

16.4 g. (0.1 mole) of 3,5-dichloropyridone-2, 15.3 g. (0.1 mole) of carbon tetrachloride and 18.2 g. (0.1 mole) of diisopropyl thionohydrogenphosphite were suspended in 200 cc. of benzene, and then a solution of 10 g. (0.1 mole) of triethylamine in 50 cc. of benzene was added dropwise thereto with stirring.

The resulting mixture was treated in the same manner as described in Example 4 to obtain 42.2 g. of a yellow and transparent oily substance.

Yield: 81.5%
$n_D^{16.5}$: 1.4751

While, according to the conventional method the obtained product was a mixture of objective compound and pyridone derivative because an absorption assigned to $>C=O$ of pyridone was observed from IR spectrum.

EXAMPLE 9

Production of 2-dimethoxyphosphinyloxy-3,5,6-trichloropyridine.

19.8 g. (0.1 mole) of 3,5,6-trichloropyridone-2, 15.3 g. (0.1 mole) of carbon tetrachloride and 11.0 g. (0.1 mole) of dimethyl hydrogenphosphite were suspended in 200 cc. of benzene, and then a solution of 10.1 g. (0.1 mole) of triethylamine in 50 cc. of benzene was added dropwise thereto with stirring. The reaction proceeded to precipitate by-produced triethylamine hydrochloride. After completion of the addition, stirring was continued under reflux for 4 hours to complete the reaction. After cooling, the triethylamine hydrochloride was filtered off, and then the filtrate was washed with water, dried with anhydrous sodium sulfate and concentrated to obtain 26 g. of a crystal. This crystal was recrystallized from ligroin to obtain 24.8 g. of a white prismatic crystal having a melting point of 87–8° C.

Yield: 81.0%

*Elementary analysis.*—Calculated value: P, 9.96%. Found value: 10.11%.

The IR spectrum of this compound had not absorption band of pyridone at 1,680–1,675 cm.$^{-1}$.

As a control, the same object product was prepared in the conventional method.

19.8 g. (0.1 mole) of 3,5,6-trichloropyridone-2 and 10.1 g. (0.1 mole) of triethylamine were dissolved in 200 cc. of benzene and then a solution of 14.5 g. (0.1 mole) of dimethyl phosphoryl chloride in 50 cc. of benzene was added dropwise thereto with stirring. After completion of the addition, stirring was continued under reflux for 4 hours to complete the reaction. The precipitated triethylamine hydrochloride was filtered off, and then the filtrate was washed with water, dried with anhydrous sodium sulfate and concentrated to obtain 14.5 g. of a crystal. This crystal was recrystallized from ligroin to obtain 12.5 g. of a white prismatic crystal having a melting point of 86–8° C. The yield was 40.8%.

EXAMPLE 10

Production of 2-diethoxyphosphinyloxy-3,5,6-trichloropyridine.

19.8 g. (0.1 mole) of 3,5,6-trichloropyridone-2, 15.3 g. (0.1 mole) of carbon tetrachloride and 13.8 g. (0.1 mole) of diethyl hydrogenphosphite were suspended in 200 cc. of benzene, and then a solution of 10.1 g. (0.1 mole) of triethylamine in 50 cc. of benzene was added dropwise thereto with stirring. The resulting mixture was treated in the same manner as described in Example 9 to obtain 31.0 g. of a white prismatic crystal having a melting point of 42–4° C. The yield was 93.1%.

While, according to the conventional method a white prismatic crystal having a melting point of 42–43.5° C. was obtained in a yield of 75.0%.

EXAMPLE 11

Production of 2 - dimethoxyphosphinothioyloxy - 3,5,6-trichloropyridine.

19.8 g. (0.1 mole) of 3,5,6-trichloropyridone-2, 15.3 g. (0.1 mole) of carbon tetrachloride and 15.3 g. (0.1 mole) of dimethylthionohydrogenphosphite were suspended in 200 cc. of benzene, and then a solution of 10.1 g. (0.1 mole) of triethylamine in 50 cc. of benzene was added dropwise thereto with stirring. The reaction proceeded to precipitate by-produced triethylamine hydrochloride. After completion of the addition, stirring was continued under reflux for 4 hours to complete the reaction. After cooling, the precipitated triethylamine hydrochloride was filtered off, and then the filtrate was washed with water, dried with anhydrous sodium sulfate and concentrated to obtain a crystal. This crystal was recrystallized from ligroin to obtain 26.1 g. of a white prismatic crystal having a melting point of 43–4° C. The yield was 81.2%.

While, according to the conventional method a white prismatic crystal having a melting point of 43–4° C. was obtained in a yield of 58.3%.

EXAMPLE 12

Production of 2 - diethoxyphosphinothioyloxy - 3,5,6-trichloropyridine.

19.8 g. (0.1 mole) of 3,5,6-trichloropyridine-2, 15.3 g. (0.1 mole) of carbon tetrachloride and 15.4 g. (0.1 mole) of diethylthionohydrogenphosphite were suspended in 200 cc. of benzene, and then a solution of 10.1 g. (0.1 mole) of triethylamine in 50 cc. of benzene was added dropwise thereto with stirring. The resulting mixture was treated in the same manner as described in Example 11 to obtain 33.2 g. of a white prismatic crystal having a melting point of 42.5–43.5° C. The yield was 95.2%.

In a similar way, e.g., the following compound can be produced:

2-(diethoxyphosphinothioyloxy)-3,5-dibromo-6-chloropyridine
2-(diethoxyphosphinothioyloxy)-3,5-dibromopyridine
2-(diethoxyphospinothioyloxy)-3,4,5,6-tetrachloropyridine
2-(diethoxyphosphinothioyloxy)-5,6-dichloropyridine
2-(diethoxyphosphinothioyloxy)-6-chloropyridine.

What is claimed is:

1. A process for producing organic phosphates having the general formula

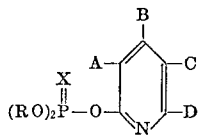

wherein R is a lower alkyl group, A, B, C and D represent hydrogen or halogen atom and X represents oxygen or sulfur atom, which comprises reacting a halogen-substituted or non-substituted pyridone-2 with a di-lower alkyl hydrogen-phosphite or a di-lower alkyl thionohydrogen-phosphite in the presence of a polyhalohydrocarbon and a base.

2. A process according to claim 1, wherein said polyhalohydrocarbon is carbon tetrachloride.

3. A process for producing organic phosphates having the general formula

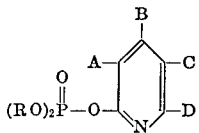

wherein R, A, B, C and D have the same meanings as described in claim 1, which comprises reacting a halogen-substituted pyridone-2 with a di-lower alkyl hydrogenphosphite in the presence of a polyhalohydrocarbon and a base.

4. A process for producing organic phosphates having the general formula

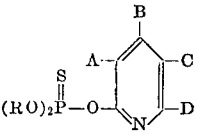

wherein R, A, B, C and D have the same meanings as described in claim 1, which comprises reacting a halogen-substituted pyridone-2 with a di-lower alkyl thionohydrogenphosphite in the presence of a polyhalohydrocarbon and a base.

5. A process according to claim 4, wherein said halogen-substituted pyridone-2 is 3,5-dichloropyridone-2.

6. A process according to claim 4, wherein said halogen-substituted pyridone-2 is 3,5,6-trichloropyridone-2.

7. A process according to claim 4, wherein said phosphite is dimethyl thionohydrogenphosphite.

8. A process according to claim 4, wherein said phosphite is diethyl thionohydrogenphosphite.

9. A process for producing organic phosphates having the general formula

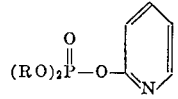

wherein R has the same meaning as described in claim 1, which comprises reacting pyridone-2 with a di-lower alkyl hydrogenphosphite in the presence of a polyhalohydrocarbon and a base.

10. A process for producing organic phosphates having the general formula

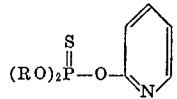

wherein R has the same meaning as described in claim 1, which comprises reacting pyridone-2 with a di-lower alkyl thionohydrogenphosphite in the presence of a polyhalohydrocarbon and a base.

11. A process according to claim 1, wherein said base is a trialkylamine.

12. A process according to claim 1, wherein said polyhalohydrocarbon is tetrachloroethylene.

13. A process according to claim 1, wherein said polyhalohydrocarbon is chloroform.

References Cited

UNITED STATES PATENTS 3,585,205   6/1971   Schmidt et al. ____ 260—294.8 K

HENRY R. JILES, Primary Examiner

R. T. BOND, Assistant Examiner

U.S. Cl. X.R.

260—297 P